US010533060B2

(12) United States Patent
Takaichi et al.

(10) Patent No.: US 10,533,060 B2
(45) Date of Patent: Jan. 14, 2020

(54) ANION-MODIFIED CELLULOSE NANOFIBER DISPERSION LIQUID AND COMPOSITION

(71) Applicant: NIPPON PAPER INDUSTRIES CO., LTD., Tokyo (JP)

(72) Inventors: Satoshi Takaichi, Tokyo (JP); Takeshi Nakayama, Tokyo (JP); Shinji Sato, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 15/573,643

(22) PCT Filed: May 13, 2016

(86) PCT No.: PCT/JP2016/064381
§ 371 (c)(1),
(2) Date: Nov. 13, 2017

(87) PCT Pub. No.: WO2016/186055
PCT Pub. Date: Nov. 24, 2016

(65) Prior Publication Data
US 2018/0066072 A1    Mar. 8, 2018

(30) Foreign Application Priority Data

May 15, 2015  (JP) ................................ 2015-100277
Feb. 16, 2016 (JP) ................................ 2016-026805

(51) Int. Cl.
C08B 15/04       (2006.01)
D21H 11/18      (2006.01)
(52) U.S. Cl.
CPC ............. C08B 15/04 (2013.01); D21H 11/18 (2013.01); *C08L 2201/08* (2013.01)
(58) Field of Classification Search
CPC ................................ C08B 15/04; D21H 11/18
See application file for complete search history.

(56) References Cited

U.S. PATENT DOCUMENTS

| 3,498,736 A * | 3/1970 | Freyermuth ........... D06M 11/01 8/120 |
| 4,481,076 A * | 11/1984 | Herrick .................. D21C 9/002 162/158 |
| 2013/0284387 A1 | 10/2013 | Umemoto et al. |
| 2014/0216671 A1 | 8/2014 | Feng et al. |
| 2014/0259458 A1* | 9/2014 | Duggirala .............. D21H 17/09 8/648 |
| 2015/0027648 A1* | 1/2015 | Tsuji ....................... C08B 15/04 162/24 |

FOREIGN PATENT DOCUMENTS

| CN | 103966890 A | 8/2014 | |
| EP | 2642020 A1 | 9/2013 | |
| EP | 2669425 A1 | 12/2013 | |
| EP | 2826792 A1 | 1/2015 | |
| JP | 2008-163053 A | 7/2008 | |
| JP | 2008-208231 A | 9/2008 | |
| JP | 2010-194790 A | 9/2010 | |
| JP | 201146793 A | 3/2011 | |
| JP | 2015-067730 A | 4/2015 | |
| WO | WO-2006110751 A1 * | 10/2006 | ............... D21C 9/00 |
| WO | 2012/067113 A1 | 5/2012 | |
| WO | 2012/119229 A1 | 9/2012 | |
| WO | 2013/137140 A1 | 9/2013 | |
| WO | 2014/088072 A1 | 6/2014 | |

OTHER PUBLICATIONS

International Search Report for Application No. PCT/JP2016/064381, dated Jul. 12, 2016. 2 pages.
Supplementary European Search Report for Application No. 16796448.5, dated Jan. 9, 2019, 11 pages.

* cited by examiner

*Primary Examiner* — Melvin C. Mayes
*Assistant Examiner* — Michael Forrest
(74) *Attorney, Agent, or Firm* — McCarter & English, LLP; Steven G. Davis; Wei Song

(57) ABSTRACT

The present invention provides a dispersion liquid of anion-modified cellulose nanofibers and a composition of anion-modified cellulose nanofibers that are not colored when heated. Specifically, the dispersion liquid contains anion-modified cellulose nanofibers; an anti-coloring agent selected from the group consisting of borate salts and sulfite salts, or combinations thereof in an amount of 1 to 30 mass % based on an absolute dry mass of the anion-modified cellulose nanofibers; and a solvent.

11 Claims, No Drawings

ANION-MODIFIED CELLULOSE NANOFIBER DISPERSION LIQUID AND COMPOSITION

CROSS-REFERENCE TO RELATED APPLICATIONS

This application is a U.S. national stage filing, under 35 U.S.C. § 371(c), of International Application No. PCT/JP2016/064381, filed on May 13, 2016, which claims priority to Japanese Patent Application No. 2016-026805, filed on Feb. 16, 2016 and Japanese Patent Application No. 2015-100277, filed on May 15, 2015. The entire contents of each of the aforementioned applications are incorporated herein by reference.

TECHNICAL FIELD

The present invention relates to a dispersion liquid of anion-modified cellulose nanofibers and a composition of anion-modified cellulose nanofibers.

BACKGROUND ART

It is known that a treatment of cellulose materials under the coexistence of 2,2,6,6-tetramethyl-1-piperidine-N-oxyradical (hereinafter referred to as TEMPO) and an inexpensive oxidizing agent, sodium hypochlorite, allows an efficient introduction of carboxyl groups to the surface of cellulose microfibrils. The thus obtained, oxidized cellulose may be converted to a homogenous, transparent aqueous dispersion liquid of cellulose nanofibers by an addition of a small defibration energy. Such methods for manufacturing oxidized cellulose and methods for manufacturing cellulose nanofibers have been studied widely (PTL 1).

CITATION LIST

Patent Literature

PTL 1: JP Publication No. 2008-001728

SUMMARY OF INVENTION

Technical Problem

However, the cellulose nanofibers disclosed in PTL 1 was deficient in that it was colored when heated. Such cellulose nanofibers were not suitable for industrial use because a product obtained by thermally processing such cellulose nanofibers would change its color.

Hence, the object of the present invention is to provide a dispersion liquid of anion-modified cellulose nanofibers and a composition of anion-modified cellulose nanofibers that are not colored when heated.

Solution to Problem

The above problem is solved by the following invention.
(1) A dispersion liquid of anion-modified cellulose nanofibers comprising:
  anion-modified cellulose nanofibers;
  an anti-coloring agent selected from the group consisting of borate salts and sulfite salts, or combinations thereof in an amount of 1 to 30 mass % based on an absolute dry mass of the anion-modified cellulose nanofibers; and
  a solvent.
(2) The dispersion liquid according to (1), wherein a total amount of the anti-coloring agent is 1 to 15 mass % based on an absolute dry mass of the anion-modified cellulose nanofibers.
(3) The dispersion liquid according to (1) or (2) having a pH of 6.5 to 10.
(4) The dispersion liquid according to any one of (1) to (3), wherein the anion-modified cellulose nanofibers have carboxyl groups in an amount of 0.5 to 2.0 mmol/g based on an absolute dry mass of anion-modified cellulose nanofibers.
(5) The dispersion liquid according to any one of (1) to (3), wherein the anion-modified cellulose nanofibers are carboxymethylated cellulose nanofibers having a degree of carboxymethyl substitution of 0.01 to 0.50 per a glucose unit of anion-modified cellulose nanofibers.
(6) The dispersion liquid according to any one of (1) to (5), wherein the anion-modified cellulose nanofibers are reduced by a reducing agent.
(7) The dispersion liquid according to any one of (1) to (6), wherein the anion-modified cellulose nanofibers have an average fiber length of 50 to 2000 nm, and an average fiber diameter of 2 to 50 nm.
(8) A composition of anion-modified cellulose nanofibers obtained by removing a solvent from the dispersion liquid of anion-modified cellulose nanofibers according to any one of (1) to (7).
(9) A method of manufacturing the dispersion liquid according to any one of (1) to (7) comprising:
  (i) oxidizing a cellulose material in water using an oxidizing agent in the presence of an N-oxyl compound and a compound selected from the group consisting of bromides and iodides, or mixtures thereof to prepare oxidized cellulose;
  (ii) defibrating the oxidized cellulose to obtain a dispersion liquid of oxidized cellulose nanofibers; and
  (iii) obtaining a dispersion liquid of cellulose nanofibers containing the dispersion liquid of oxidized cellulose nanofibers and the anti-coloring agent.
(10) A method of manufacturing the composition according to (8) comprising:
  (i) oxidizing a cellulose material in water using an oxidizing agent in the presence of an N-oxyl compound and a compound selected from the group consisting of bromides and iodides, or mixtures thereof to prepare oxidized cellulose;
  (ii) defibrating the oxidized cellulose to obtain a dispersion liquid of oxidized cellulose nanofibers;
  (iii) obtaining a dispersion liquid of cellulose nanofibers containing the dispersion liquid of oxidized cellulose nanofibers and the anti-coloring agent; and
  (iv) removing the water from the dispersion liquid of nanofibers.
(11) A sheet containing the composition according to (8).

Advantageous Effects of Invention

The present invention may provide a dispersion liquid of anion-modified cellulose nanofibers and a composition of anion-modified cellulose nanofibers that are not colored when heated.

DESCRIPTION OF EMBODIMENTS

The present invention is described in detail below. In the present invention, the expression "X to Y" includes the end values, X and Y.

In the present invention, a dispersion liquid of anion-modified cellulose nanofibers is a liquid comprising anion-modified cellulose nanofibers, an anti-coloring agent selected from the group consisting of borate salts and sulfite salts, or combinations thereof, and a solvent, in which the anion-modified cellulose nanofibers are dispersed in the solvent. In addition, a composition of anion-modified cellulose nanofibers is a composition comprising the aforementioned nanofibers and the anti-coloring agent. The composition may contain a solvent, etc. In such a composition containing the solvent, nanofibers do not need to be dispersed in the solvent.

1. Dispersion Liquid of Anion-Modified Cellulose Nanofibers (1) Anti-Coloring Agent An anti-coloring agent is an additive that prevents the anion-modified cellulose nanofibers (hereinafter referred to as "anion-modified CNF") from being colored when heated. The anti-coloring agents used in the present invention are those selected from the group consisting of borate salts and sulfite salts, or combinations thereof.

(1-1) Borate Salts

As used in the present invention, the term "borate salts" is a collective name for borates and boronates. The term "borate" as used in the present invention is a salt composed of an anion derived from boric acid ($B(OH)_3$) and monovalent metal ion(s). Alkali metal ions are preferred as the metal ion(s). An anion derived from boric acid is a borate ion $[BO_3]^{3-}$, hydrogenborate ion $[HBO_3]^{2-}$, or dihydrogenborate ion $[H_2BO_3]^-$. The term "boronate" as used in the present invention is a salt composed of an anion, $[R—BO_2H]^-$ or $[R—BO_2]^{2-}$, derived from boronic acid and monovalent metal ion(s). R is a monovalent hydrocarbon group, preferably an alkyl group or an aryl group. Among of them, a phenyl group or an alkyl phenyl group is preferred. A boronic acid in which R is a phenyl group is a phenylboronic acid. In other words, borate salts as used in the present invention refer to salts represented as $M_3[BO_3]$, $M_2[HBO_3]$, $M[H_2BO_3]$, $M_2[R—BO_2]$, or $M[R—BO_2H]$, wherein M is monovalent metal ion(s) and R is monovalent hydrocarbon group(s). These borate salts may exist in the dispersion liquid of anion-modified CNF and the composition of anion-modified CNF as a solid, in an ionized form, or by being reacted with a functional group in the anion-modified CNF.

Examples of preferred borate salts include sodium borate, lithium borate, potassium borate, rubidium borate, cesium borate, sodium boronate, potassium boronate, rubidium boronate and cesium boronate, etc. For example, sodium borate is a salt composed of one of the three types of anions derived from boric acid or a combination thereof and $Na^+$. In view of cost and obtainability, sodium borate is preferred in the present invention.

The amount of borate salts is preferably 1 to 30 mass %, more preferably 5 to 25 mass %, and even more preferably 10 to 15 mass % based on an absolute dry mass of anion-modified cellulose nanofibers. When the among of borate salts is either less than 1 mass % or more than 30 mass %, a sufficient color suppressing effect is not obtained.

The mechanism by which the borate salts act as an anti-coloring agent is considered as follows without being limited thereby. It is presumed that anion-modified cellulose nanofibers are decomposed by heating, and then, go through dehydration reaction and condensation reaction to form a colored material. Addition of borate salts during this process induces a reaction of borate salts and hydroxyl groups in the cellulose nanofibers, whereby boric acid esters are generated. This is considered to suppress further decomposition and dehydration of the decomposition product formed by heating and thereby prevent coloring. The degree of coloring may be assessed by visual observation or by using a spectrocolorimeter without being limited thereby.

(1-2) Sulfite Salts

As used in the present invention, the term "sulfite salts" refers to sulfites ($M_2SO_3$: M is a monovalent cation site), hydrogensulfites ($MHSO_3$: M is a monovalent cation site), pyrosulfites ($M_2S_2O_5$ or $M'S_2O_5$: M is a monovalent cation site, M' is a divalent cation site), hyposulfites ($M_2S_2O_4$ or $M'S_2O_4$: M is a monovalent cation site, M' is a divalent cation site), or hydrates thereof. M may be alkali metal ions or an ammonium ion. M' may be alkali earth metal ions. Preferable sulfite salts are sodium hydrogensulfite, potassium hydrogensulfite, ammonium hydrogensulfite, sodium sulfite, potassium sulfite, ammonium sulfite, sodium hypo sulfite, potassium hypo sulfite, calcium hypo sulfite, sodium pyrosulfite, potassium pyrosulfite, magnesium pyrosulfite, calcium pyrosulfite, etc., of which sodium hydrogensulfite is particularly preferable.

In the present invention, the amount of sulfite salts is preferably 0.1 to 15 mass %, more preferably 1 to 15 mass %, even more preferably 1.0 to 12 mass %, and even more preferably 3.0 to 10 mass % based on an absolute dry mass of anion-modified CNF.

The mechanism by which the sulfite salts act as an anti-coloring agent is considered as follows without being limited thereby. An anion-modified CNF includes ketone groups and aldehyde groups resulting from the oxidation of its hydroxyl groups by anion modification. Heating of such an anion-modified CNF causes a β-elimination reaction using the ketone groups and the aldehyde groups as a foothold, and the reaction generates a new unreduced terminal that includes 2,3-diketone derived from the ketone groups and α,β-unsaturated aldehyde derived from the aldehyde groups. The new reduced terminal further goes through a pealing reaction which brings about an accumulation of colored materials that include 2,3-diketone. In the present invention, it is presumed that the sulfite salts reduce the ketone groups and the aldehyde groups existing in the anion-modified CNF and thereby suppress the coloring caused by heating.

The aforementioned effect is especially prevalent in a carboxyl-modified CNF comprising 0.5 to 2.0 mmol/g of carboxyl groups, which is produced by defibrating oxidized cellulose that is obtained by oxidizing cellulose materials using oxidizing catalysts—such as N-oxyl compounds (TEMPO, TEMPO derivatives, etc.)—and oxidizing agents, or by oxidizing cellulose materials using ozone. In the production of oxidized cellulose using N-oxyl compounds as the oxydizing catalyst, carboxyl groups are generated selectively at position-C6, while as a secondary reaction, secondary alcohols at position-C2 and position-C3 of cellulose are oxidized by N-oxyl compounds and sodium hypochlorite which results in the generation of ketone groups at position-C2 and position-C3. Further, the oxidation to the carboxyl group at position-C6 stimulated by the TEMPO catalyst is a two stage reaction via aldehyde, and some aldehyde groups remain without being oxidized into carboxyl groups. By this mechanism, the conventional carboxyl-modified CNF has a problem in that it is colored when heated, but the present invention overcomes this problem by using sulfite salts as mentioned above. Further, sulfite salts are advantageous in that they do not damage cellulose nanofibers, that they are extremely safe as a material, and that they are not designated as PRTR (Pollutant Release and Transfer Register) substances in Japan. Hence, a use of sulfite salts allows both a suppression of coloring and safety to be achieved. Sulfite salts may exist in the dispersion liquid of anion-modified CNF and composition of anion-modified CNF as solids, in an ionized form, or in an oxidized form.

When combining borate salts and sulfite salts for use as the anti-coloring agent, it is preferred for each to be used in the aforementioned amounts.

(1-3) Anion-Modified Cellulose Nanofibers

The average fiber diameter of anion-modified CNF in the present invention is 2 to 1000 nm, in which the lower limit is preferably 2.5 nm, more preferably 3 nm, and even more preferably 4 nm, and the upper limit is preferably 500 nm, more preferably 100 nm, and even more preferably about 10 nm. The average fiber length is preferably 100 to 3000 nm, more preferably 150 to 1500 nm, and even more preferably 200 to 1000 nm. The aspect ratio (average fiber length/average fiber diameter) of the anion-modified CNF is preferably 10 to 1000, and more preferably 100 to 1000. The anion-modified CNF may be obtained by defibrating anion-modified cellulose including a carboxylated cellulose (also referred to as "oxidized cellulose"), a carboxymethyl cellulose obtained by modifying the cellulose material, or a cellulose that had a phosphate ester introduced therein. The starting materials and the methods of modification are explained hereunder.

<Cellulose Material>

Cellulose materials for producing anion-modified cellulose include the following: materials derived from plant materials (e.g. wood, bamboo, hemp, jute, kenaf, wastes in farm land, cloth, pulp (softwood unbleached kraft pulp (NUKP), softwood bleached kraft pulp (NBKP), hardwood unbleached kraft pulp (LUKP), hardwood bleached kraft pulp (LBKP), softwood unbleached sulfite pulp (NUSP), softwood bleached sulfite pulp (NBSP), thermomechanical pulp (TMP), recycled pulp, waste paper, etc.), animal materials (e.g. Ascidiacea), algae, microorganism (e.g. acetobacter), or microorganism products; regenerated cellulose produced by spinning cellulose after dissolving it in some solvent such as a copper-ammonia solution or a morpholine derivative, etc.; fine cellulose obtained by depolymerizing cellulose through subjecting the cellulose material to hydrolysis, alkali hydrolysis, enzymolysis, blasting, or mechanical treatment such as in a vibrating ball mill. Any materials given herein may be used. Among them, cellulose fibers derived from plants or microorganisms is preferred, and cellulose fibers derived from plants is more preferred.

<Carboxymethylation>

The carboxymethylated cellulose may be obtained by carboxymethylating the aforementioned cellulose materials by commonly known methods, or by using commercially available products. In either case, the degree of substitution of the carboxymethyl group per a unit of anhydrous glucose of cellulose is preferably 0.01 to 0.50. The following example is given as a method for producing such a carboxymethylated cellulose.

Cellulose is used as a starting base material in a solvent in an amount of 3 to 20 times the mass of the cellulose. The solvent is water, lower alcohol or a mixture of these. Lower alcohol includes methanol, ethanol, n-propyl alcohol, isopropyl alcohol, n-butanol, isobutanol, tertiary butanol or combinations thereof. The proportion of lower alcohol in a mixed solvent of water and lower alcohol is 60 to 95 mass %. Used as a mercerization agent is alkali metal hydroxide—specifically, sodium hydroxide or potassium hydroxide—in an amount of 0.5 to 20 molar equivalents per an anhydrous glucose residue in the starting base material. The starting base material is mixed with the solvent and the mercerization agent to undergo a mercerization treatment at a reaction temperature of 0 to 70° C., preferably 10 to 60° C., and a reaction time of 15 min. to 8 h., preferably 30 min. to 7 h. Then, a carboxymethylation agent is added in an amount of 0.05 to 10.0 molar equivalents per a glucose residue, and etherification is conducted at a reaction temperature of 30 to 90° C., preferably 40 to 80° C., and a reaction time of 30 min. to 10 h., preferably 1 h. to 4 h.

As used in the present invention, the "carboxymethylated cellulose" is fiber whose fiber shape is at least partly preserved even when it is dispersed in water. Hence, carboxymethylated cellulose is differentiated from carboxymethyl cellulose, mentioned below, which is a type of water-soluble polymer. When an aqueous dispersion liquid of carboxymethylated cellulose is observed with an electron microscope, a fibrous material can be observed. On the other hand, when an aqueous dispersion liquid of carboxymethyl cellulose, which is a type of water-soluble polymer, is observed, no fibrous material can be observed. Further, a peak of a type I cellulose crystal is observed when measuring carboxymethylated cellulose by X-ray diffraction, while no peak of a type I cellulose crystal is observed in carboxymethyl cellulose, which is a type of water-soluble polymer.

<Carboxylation>

Carboxylated cellulose (oxidized cellulose) may be obtained by carboxylating (oxidizing) the above cellulose material by a commonly known method. In the carboxylation, the amount of carboxyl groups is adjusted to preferably 0.2 mmol/g or higher, more preferably 0.5 to 2.0 mmol/g, even more preferably 0.6 to 2.0 mmol/g, even more preferably 1.0 to 2.0 mmol/g, and most preferably 1.0 to 1.8 mmol/g based on an absolute dry mass of anion-modified cellulose nanofibers without being limited thereby. The amount of carboxyl groups may be adjusted by the oxidation reaction time, the oxidation reaction temperature, the pH during oxidation reaction, and the amount of N-oxyl compounds, bromides, iodides, or oxidizing agents to be added.

An example of the carboxylation (oxidation) method includes a method of oxidizing cellulose material in water in the presence of an N-oxyl compound and a compound selected from the group consisting of bromides and iodides, or mixtures thereof, by using an oxidizing agent. This oxidation reaction allows the selective oxidation of a primary hydroxyl group on position-C6 of a glucopyranose ring on the cellulose surface to provide a cellulose fibers having aldehyde groups, and carboxyl groups (—COOH) or carboxylate groups (—COO—) on the surface. The concentration of cellulose during reaction is not particularly limited, but is preferably 5 mass % or lower.

An N-oxyl compound is a compound that can produce nitroxyl radical. Any N-oxyl compound may be used as long as it stimulates the desired oxidation reaction. Examples include 2,2,6,6-tetramethylpiperidine 1-oxyl radical (TEMPO) or a derivative thereof (e.g. 4-hydroxy TEMPO).

The amount of an N-oxyl compound to be used may be a catalytic amount that allows cellulose, which is the starting material, to be oxidized without being limited thereby. An exemplary amount is preferably 0.01 to 10 mmol, more preferably 0.01 to 1 mmol, and even more preferably 0.05 to 0.5 mmol per 1 g of absolute dry cellulose. Also, the amount of the N-oxyl compound may be about 0.1 to 4 mmol/L based on the reaction system.

A bromide is a compound comprising bromine, which includes, for example, alkali metal bromide that may be dissociated in water and ionized. In addition, an iodide is a compound comprising iodine, which includes, for example, alkali metal iodide. The amount of bromide or iodide that may be used may be selected from a range that allows stimulation of the oxidation reaction. The total amount of bromides and iodides is preferably 0.1 to 100 mmol, more preferably 0.1 to 10 mmol, and even more preferably 0.5 to 5 mmol per 1 g of an absolute dry cellulose.

As an oxidizing agent, a commonly known oxidizing agent may be used, such as halogen, hypohalous acid, halous acid, perhalic acid or salts thereof, as well as halogen oxide, or halogen peroxide. Preferred among these is sodium hypochlorite which is inexpensive and has a low environment impact. The amount of the oxidizing agent is preferably 0.5 to 500 mmol, more preferably 0.5 to 50 mmol, even more preferably 1 to 25 mmol, and most preferably 3 to 10 mmol per 1 g of absolute dry cellulose. Further, an amount of 1 to 40 mol based on 1 mol of N-oxyl compounds is preferred.

The step of oxidizing cellulose may proceed efficiently even under a relatively mild condition. Hence, the reaction temperature is preferably 4 to 40° C., and it may well be a room temperature of about 15 to 30° C. As the reaction proceeds, the pH of the reaction solution is found to decrease because carboxyl groups are generated in the cellulose. To allow the oxidation reaction to proceed efficiently, an alkali solution such as a sodium hydroxide solution is added to maintain the pH of the reaction solution preferably at 8 to 12, and more preferably at about 10 to 11. As the reaction medium, water is preferred because of its ease of handling and low likelihood of side reactions, etc.

The reaction time of the oxidation reaction may be appropriately set according to the degree of the progress in oxidation, and it is normally 0.5 to 6 h., preferably about 2 to 4 h.

The oxidation reaction may be performed in two separate stages. As a way of example, the oxidized cellulose obtained through filtration after the completion of the reaction in the first stage may be further oxidized by a same or different reaction condition to achieve efficient oxidation without being hindered by the salt that had been produced as a byproduct of the reaction in the first stage.

Another example of a carboxylation (oxidation) method is a method of oxidizing the cellulose material by bringing it in contact with an ozone-containing gas. This oxidation reaction oxidizes the hydroxyl groups on at least position-2 and position-6 of the glucopyranose ring, while causing the decomposition of the cellulose chain. The ozone concentration in the ozone-containing gas is preferably 50 to 250 $g/m^3$, and more preferably 50 to 220 $g/m^3$. The amount of ozone added relative to the cellulose material is preferably 0.1 to 30 mass parts, and more preferably 5 to 30 mass parts based on 100 mass parts of a solid of the cellulose material (absolute dry mass). The ozone treatment temperature is preferably 0 to 50° C., and more preferably 20 to 50° C. The ozone treatment time is about 1 to 360 min., and preferably about 30 to 360 min., without being limited thereby. When the ozone treatment condition is in this range, it prevents cellulose from being exessively oxidized or decomposed, and provides a good yield of oxidized cellulose. An additional oxidation treatment may be performed using an oxidizing agent after performing the ozone treatment. The oxidizing agent to be used in the additional oxidation treatment is not particularly limited, but includes chlorine-based compounds such as chlorine dioxide, sodium chlorite, etc., and oxygen, hydrogen peroxide, persulfuric acid, peracetic acid, etc. For example, an additional oxidation treatment may be performed by dissolving these oxidizing agents in water or a polar organic solvent, such as alcohol, to create an oxidizing agent solution, and immersing the cellulose material in the solution.

In the present invention, it is preferable to use a reduced, carboxylated CNF to suppress coloring. A reduction treatment provides an especially high effect when the borate salts are used as the anti-coloring agent. The reduction treatment is preferably performed against the oxidized cellulose material before defibration. Any reducing agent may be used as long as it can reduce aldehyde groups and ketone groups that had been created in part to alcohol. Examples of the reducing agent include thiourea, hydro sulfite, sodium hydrogensulfite, sodium borohydride, sodium cyanoborohydride, lithium borohydride, etc. The amount of reducing agent to be used is 0.1 to 150 mass parts, preferably 0.5 to 100 mass parts, and more preferably about 1 to 50 mass parts based on 100 mass parts of oxidized cellulose material. The reduction treatment temperature is desirably about 10 to 90° C., more preferably 20 to 70° C. to provide efficient reduction treatment, and suppress deterioration of fibers. The pH during the reduction treatment may be appropriately adjusted according to the reducing agent to be used, but it is normally pH 2 to 12, and preferably pH 3 to 10. The reaction time in the reduction reaction may be appropriately set according to the degree of progress in reduction, and it is normally 0.5 to 6 h., preferably 1 to 5 h., and more preferably 1 to 4 h. without being limited thereby.

<Defibration>

A defibration of anion-modified cellulose provides cellulose nanofibers. Machines to be used for defibration are not particularly limited, and include a high-speed rotating machine, a colloid mill machine, a high-pressure machine, a roll mill machine, an ultrasonic machine, etc. It is preferable to apply strong shear force to the aqueous dispersion of anion-modified cellulose when performing defibration. In particular, it is preferable to apply a pressure of 50 MPa or higher to the aqueous dispersion, and to use a wet, high-pressure or ultrahigh-pressure homogenizer that can apply a strong shear force to perform efficient defibration. This pressure is preferably 100 MPa or higher, and more preferably 140 MPa or higher. Prior to the defibration and dispersion treatment by a high-pressure homogenizer, the aqueous dispersion may be subjected to pretreatment using a commonly known mixing, agitation, emulsification and dispersion machine such as a high-speed shearing mixer.

(1-4) Dispersion Liquid of Anion-Modified CNF

The dispersion liquid of anion-modified CNF of the present invention may be obtained as shown above. The anti-coloring agent may be added to anion-modified cellulose before defibration, or to the dispersion liquid of anion-modified CNF obtained by defibration. However, it is preferable to add it to the dispersion liquid of anion-modified CNF after defibration for the purpose of improving the defibration efficiency. The temperature at which the anti-coloring agent is added, although not particularly limited, is preferably 0 to 50° C., and more preferably 10 to 40° C. The pH of the dispersion liquid of anion-modified CNF is preferably 6.5 to 10, more preferably 8 to 9.5 without being limited thereby. When the pH of the dispersion liquid is in this range, high effect on suppressing coloring can be obtained. The solvent is preferred to be water in view of solubility of the anti-coloring agent, but may include an organic solvent such as alcohol in a range that does not reduce solubility. The concentration of the anion-modified CNF in the dispersion liquid is preferably 0.1 to 10% (w/v).

(1-5) Anion-Modified CNF Composition

An anion-modified CNF composition is a composition comprising an anion-modified CNF and the anti-coloring agent, and the composition is preferably obtained by drying the dispersion liquid of anion-modified CNF. Drying a dispersion liquid means removing the solvent from the dispersion liquid. The composition may be in an absolute dry state which is free of solvent, or it may contain the solvent in an amount of about 10 to 100000 mass % based on the absolute dry mass of anion-modified CNF. In the anion-modified CNF composition obtained in this manner, the anti-coloring agent may exist in a reacted form with functional groups such as the hydroxyl groups in the anion-modified CNF. However, it is unrealistic to identify the reacted form or to determine the amount of such reacted form.

The solvent including water may be removed by using a centrifugal dehydrator, a vacuum dehydrator, a pressurized dehydrator, or a combination thereof. Further, the solvent may be removed by spray drying, pressing, air drying, hot air drying or vacuum drying. The drying machine includes, without being limited thereby, a continuous tunnel drying machine, a band drying machine, a vertical drying machine, a vertical turbo drying machine, a multi-layered saucer drying machine, a ventilation drying machine, a rotation drying machine, an air flow drying machine, a spray drier drying machine, a spraying drying machine, a cylindrical drying machine, a drum drying machine, a belt drying machine, a screw conveyor drying machine, a rotating drying machine with a heated tube, a vibration transport drying machine, a batch-type boxed drying machine, a ventilation drying machine, a vacuum box type drying machine, an agitation drying machine, etc. and a combination thereof.

The anion-modified CNF composition of the present invention may be used as an additive, etc. in various fields. Such fields include, for example, food, beverage, personal care products, cosmetics, pharmaceutical products, various chemical products, paper making, engineering works, paints, ink, coating compositions, agricultural chemicals, architecture, automobiles, quarantine drugs, electronic materials, batteries, flame retardants, heat insulators, miscellaneous household items, detergents, water treatment, drilling liquid, neutral functional materials, controlling the runoff of or collection of shale gas and oil. Specifically, the composition may be used as a thickener, a gelling agent, a paste, a food additive, an excipient, a reinforcement of rubber/plastic, an additive for paint, an additive for an adhesive, an additive for paper making, an abrasive, a water absorption material, a deodorant, a rust preventive, a water-holding agent, a humectant, a refregerant, a shape retention agent, a mud adjustment agent, a filter aid, and a mud overflow prevention agent. The composition may also be applied to a rubber/plastic material, paint, an adhesive, a coating agent for coated paper, a coated paper, a binder, cosmetics, a lubricating composition, an abrasive composition, an agent for removing wrinkles from clothing, and an agent for smooth ironing that contain the above agents as a component.

In particular, the CNF composition of the present invention obtained by TEMPO oxidation is preferable as a thin film member such as a film or a sheet, or as a material for molded products.

2. Manufacture Method for Dispersion Liquid of Anion-Modified CNF and Composition of Anion-Modified CNF The dispersion liquid of anion-modified CNF is preferably manufactured, without being limited thereby, by a method comprising the following steps (i) to (iii).

(i) oxidizing a cellulose material in water using an oxidizing agent in the presence of an N-oxyl compound and a compound selected from the group consisting of bromides and iodides, or mixtures thereof to prepare oxidized cellulose;

(ii) defibrating the oxidized cellulose to obtain a dispersion liquid of oxidized cellulose nanofibers; and (iii) obtaining a dispersion liquid of cellulose nanofibers containing the dispersion liquid of oxidized cellulose nanofibers and the anti-coloring agent.

In step (iii), an anti-coloring agent is added to and mixed with the dispersion liquid of oxidized cellulose nanofibers. The temperature during the process is not particularly limited, but is preferably 0 to 50° C., more preferably 10 to 40° C. The pH of the dispersion liquid after addition of the anti-coloring agent is preferably 4 to 10, more preferably 5 to 9. The pH may be adjusted with a sodium hydroxide solution when the anti-coloring agent is added. The conditions for mixing are not particularly limited, but a propeller agitation device with 600 rotations may be used for 0.5 to 6 h. of mixing.

A composition of anion-modified CNF may be obtained by removing water from the thus obtained dispersion liquid (step (iv)). The conditions for removing water are as mentioned above.

EXAMPLES

The present invention is described in more detail by referring to working examples below without being limited thereby.

Example A

<Manufacture of Carboxylated (TEMPO Oxidized) CNF>

A bleached, unbeaten kraft pulp derived from softwood (brightness 85%) in an amount of 500 g (absolute dry mass) was added to 500 ml of aqueous solution that dissolves 780 mg of TEMPO (Sigma Aldrich) and 75.5 g of sodium bromide, and the mixture was agitated until the pulp was evenly dispersed. A sodium hypochlorite solution was added to the reaction system to a concentration of 6.0 mmol/g to start the oxidation reaction. The system pH dropped during the reaction, but a 3M sodium hydroxide solution was successively added to adjust the pH to 10. The reaction ended when the sodium hypochlorite was consumed and the system pH no longer changed. The mixture after the reaction ended was run through a glass filter to separate out the pulp, which was washed fully with water to obtain oxidized pulp (carboxylated cellulose). The pulp was obtained in a yield of 90% at that time, the oxidation took 90 min., and the amount of carboxyl groups was 1.6 mmol/g.

The oxidized pulp obtained by the above step was adjusted with water to 1.0% (w/v), subjected to five cycles of treatment with an ultra high-pressure homogenizer (20° C., 150 MPa) to obtain a dispersion liquid of anion-modified cellulose nanofibers. The average fiber diameter of the obtained fiber was 4 nm, and the aspect ratio was 150.

<Manufacture of Carboxylated (TEMPO Oxidized) CNF that had been Reduced>

The same carboxylated cellulose as used in the aforementioned manufacture of carboxylated (TEMPO oxidized) CNF was prepared in an amount of 40 g (absolute dry mass), and added to 1960 ml of ion-exchanged water. The mixture was agitated until the pulp was evenly dispersed. After adding an aqueous solution of sodium hydroxide to adjust the pH of the dispersion liquid of pulp to 10.5, 0.2 g of sodium borohydride was added, and the mixture was agitated at room temperature for 1.5 h. The mixture after the reaction ended was run through a glass filter to separate out the pulp, which was washed fully with water to obtain a reduced, carboxylated cellulose.

Water was added to the reduced, carboxylated cellulose obtained by the aforementioned step to prepare a mixture with a 1.0% (w/v) concentration, and the mixture was subjected to five cycles of treatment with the ultra high pressure homogenizer (20° C., 150 MPa) to obtain a dispersion liquid of anion-modified cellulose nanofibers. The average fiber diameter of the obtained fiber was 4 nm, and the aspect ratio was 150.

<Measurement Method of Amount of Carboxyl Groups>

A 0.5 mass % slurry of carboxylated cellulose (aqueous dispersion liquid) was prepared in an amount of 60 ml, then 0.1 M hydrochloric acid solution was added until the pH was 2.5. Then, a 0.05 N sodium hydroxide solution was added dropwise while the electric conductivity was measured until the pH reached 11. The following calculation was performed using the amount of sodium hydroxide (a) consumed in the neutralization stage of weak acid, which shows a moderate change in electric conductivity.

Amount of carboxyl groups [mmol/g carboxylated cellulose]=a [ml]×0.05/mass [g] of carboxylated cellulose.

<Measurement Method of Average Fiber Diameter, Aspect Ratio>

The average fiber diameter and the average fiber length of the anion-modified CNF were analyzed for 200 fibers selected randomly by using a field emission scanning electron microscope (FE-SEM). The aspect ratio was obtained by the following formula.

Aspect ratio=average fiber length/average fiber diameter

<Assessment of Degree of Coloring>

The degree to which coloring is suppressed by carboxylated (TEMPO oxidized) CNF was assessed by visual observation according to the standard shown below after subjecting a 50 µm thick CNF film prepared from an aqueous dispersion liquid of carboxylated CNF to thermal processing at 150° C. for 30 min. Note that the aforementioned CNF film was prepared by drying the aqueous dispersion liquid of carboxylated CNF on a polystyrene petri dish at 40° C. for 24 h.

No coloring: ++>+>±>-(no borate salts added)>—: Colored

Example A1

To 100 mass parts of an 1.0% (w/v) aqueous dispersion liquid of carboxylated (TEMPO oxidized) CNF was added 0.1 mass part of a boric acid solution (10 mass % concentration), the mixture was stirred well while a sodium hydroxide solution was added to adjust the pH to 8.9, and a CNF aqueous dispersion liquid containing 1 mass % of borate per CNF was obtained. The obtained dispersion liquid was spread on a polystyrene petri dish, and dried at 40° C. for 24 h. to obtain a 50 µm thick CNF film containing 10 mass % of borate per CNF. The aforementioned boric acid was formed into sodium borate in the system due to the presence of sodium hydroxide.

Example A2

The experiment was performed similarly to Example 1 except that 0.5 mass part of the aforementioned boric acid solution was added to 100 mass parts of a 1.0% (w/v) aqueous dispersion liquid of carboxylated (TEMPO oxidized) CNF, and a CNF film containing 5 mass % of borate per CNF was obtained.

Example A3

The experiment was performed similarly to Example 1 except that 1.0 mass part of the aforementioned boric acid solution was added to 100 mass parts of an 1.0% (w/v) aqueous dispersion liquid of carboxylated (TEMPO oxidized) CNF, and a CNF film containing 10 mass % of borate per CNF was obtained.

Example A4

The experiment was performed similarly to Example 1 except that 1.5 mass parts of the aforementioned boric acid solution was added to 100 mass parts of an 1.0% (w/v) aqueous dispersion liquid of carboxylated (TEMPO oxidized) CNF, and a CNF film containing 15 mass % of borate per CNF was obtained.

Example A5

The experiment was performed similarly to Example 1 except that 2.0 mass parts of the aforementioned boric acid solution was added to 100 mass parts of an 1.0% (w/v) aqueous dispersion liquid of carboxylated (TEMPO oxidized) CNF, and a CNF film containing 20 mass % of borate per CNF was obtained.

Example A6

The experiment was performed similarly to Example 1 except that 3.0 mass parts of the aforementioned boric acid solution was added to 100 mass parts of an 1.0% (w/v) aqueous dispersion liquid of carboxylated (TEMPO oxidized) CNF, and a CNF film containing 30 mass % of borate per CNF was obtained.

Example A7

The experiment was performed similarly to Example 1 except that 1.5 mass parts of the aforementioned boric acid solution was added to 100 mass parts of an 1.0% (w/v) aqueous dispersion liquid of carboxylated (TEMPO oxidized) CNF and that the aqueous dispersion liquid of carboxylated CNF containing borate was adjusted to pH 7.5 using hydrochloric acid, and a CNF film containing 15 wt % of borate per CNF was obtained.

Example A8

The experiment was performed similarly to Example A7 except that the aqueous dispersion liquid of carboxylated CNF containing borate was adjusted to pH 8.0 using hydrochloric acid, and a CNF film containing 15 mass % of borate per CNF was obtained.

Example A9

The experiment was performed similarly to Example A7 except that the aqueous dispersion liquid of carboxylated CNF containing borate was adjusted to pH 8.5 using hydrochloric acid, and a CNF film containing 15 mass % of borate per CNF was obtained.

Example A10

The experiment was performed similarly to Example A7 except that the aqueous dispersion liquid of carboxylated CNF containing borate was adjusted to pH 9.0 using a sodium hydroxide solution, and a CNF film containing 15 mass % of borate per CNF was obtained.

Example A11

The experiment was performed similarly to Example 1 except that a reduced, carboxylated (TEMPO oxidized) CNF was used as CNF, and a CNF film containing 15 mass % of borate per CNF was obtained.

Comparative Example A1

The experiment was performed similarly to Example 1 except that no borate was added, and a CNF film was obtained.

Comparative Example A2

The experiment was performed similarly to Example 1 except that 0.01 mass part of the aforementioned boric acid solution was added to 100 mass parts of an 1.0% (w/v) aqueous dispersion liquid of carboxylated (TEMPO oxidized) CNF, and a CNF film containing 0.1 mass % of borate per CNF was obtained.

Comparative Example A3

The experiment was performed similarly to Example 1 except that 1.5 mass parts of a 10 mass % diammonium hydrogenphosphate solution was added to 100 mass parts of an 1.0% (w/v) aqueous dispersion liquid of carboxylated (TEMPO oxidized) CNF, and a CNF film containing 15 mass % diammonium hydrogenphosphate per CNF was obtained.

Comparative Example A4

The experiment was performed similarly to Example 1 except that 1.5 mass parts of a 10 mass % triethyl phosphate solution was added to 100 mass parts of an 1.0% (w/v) aqueous dispersion liquid of carboxylated (TEMPO oxidized) CNF, and a CNF film containing 15 mass % triethyl phosphate per CNF was obtained.

TABLE 1

| | CNF weight ratio | Additive weight ratio | Reduction of CNF | pH | Degree of suppression of coloring |
|---|---|---|---|---|---|
| Example A1 | 99 | 1 | No | 8.9 | ± |
| Example A2 | 95 | 5 | No | 8.9 | ± |
| Example A3 | 90 | 10 | No | 8.9 | ± |
| Example A4 | 85 | 15 | No | 8.9 | + |
| Example A5 | 80 | 20 | No | 8.9 | + |
| Example A6 | 70 | 30 | No | 8.9 | ± |
| Example A7 | 85 | 15 | No | 7.5 | ± |
| Example A8 | 85 | 15 | No | 8 | ± |
| Example A9 | 85 | 15 | No | 8.5 | + |
| Example A10 | 85 | 15 | No | 9 | + |
| Example A11 | 85 | 15 | Yes | 8.9 | ++ |
| Comp. Example A1 | 100 | 0 | No | 7 | − |
| Comp. Example A2 | 99.9 | 0.1 | No | 8.9 | − |
| Comp. Example A3 | 85 | 15 | No | 7.5 | −− |
| Comp. Example A4 | 85 | 15 | No | 7 | − |

The coloring of the borate-containing CNF of Examples A1 to A11 after heating is suppressed relative to the coloring of the CNF of Comparative Example A1. Prevention or reduction of coloring after heating is advantageous for the industrial use of CNF, because it means that the material is not affected by a change in the color due to the heating process.

Example B

Example B1

<Oxidation of Pulp>
A bleached, unbeaten kraft pulp derived from hardwood (average fiber length 534 μm) in an amount of 5 g (absolute dry mass) was added to 500 ml of aqueous solution that dissolves 39 mg of TEMPO (Sigma Aldrich) and 514 mg of sodium bromide, and the mixture was agitated until the pulp was evenly dispersed. A sodium hypochlorite solution was added to the reaction system to achieve a concentration of 5.5 mmol/g to start the oxidation reaction. The system pH dropped during the reaction, but a 3M sodium hydroxide solution was successively added to adjust the pH to 10. The reaction ended when the sodium hypochlorite was consumed and the system pH no longer changed. The mixture after the reaction ended was run through a glass filter for solid-liquid separation. Water and hydrochloric acid were added to the obtained pulp fibers to prepare a dispersion liquid with a pH of about 3 and a solid concentration of 1.0 mass %. After another run of solid-liquid separation, the obtained pulp fibers were fully washed to obtain oxidized cellulose.

<Measurement of Amount of Carboxyl Groups in Oxidized Pulp>
The amount of carboxyl groups in oxidized cellulose was measured by the following method.

A 0.5 mass % slurry of oxidized cellulose was prepared in an amount of 60 ml, then a 0.1 M hydrochloric acid solution was added until the pH was 2.5. Then, a 0.05 N sodium hydroxide solution was added dropwise while the electric conductivity was measured until the pH reached 11. The following calculation was performed using the amount of sodium hydroxide (a) consumed in the neutralization stage of weak acid, which shows a moderate change in electric conductivity.

Amount of carboxyl groups [mmol/g oxidized pulp]=a [ml]×0.05/mass [g] of oxidized cellulose.

The measurement indicated that the amount of carboxyl groups of the obtained oxidized cellulose was 1.6 mmol/g.

<Defibration of Oxidized Cellulose>
The oxidized cellulose obtained in the above step was adjusted using water and sodium hydroxide to pH 7 and to a dispersion liquid with a solid concentration of 1.0 mass % (1% (w/v)), and subjected to three cycles of a treatment with an ultra high pressure homogenizer (20° C., 150 MPa) to obtain a dispersion liquid of cellulose nanofibers derived from oxidized cellulose.

<Addition of Additive to Cellulose Nanofibers>

To 50 g of dispersion liquid of cellulose nanofibers obtained by the aforementioned step (solid concentration 1.0 mass %) was added 25 mg of sodium hydrogensulfite (addition rate to absolutely dry solid of cellulose nanofibers: 5.0 mass %), and the mixture was agitated using a propeller agitator at 600 rpm while sodium hydroxide was added for neutralization.

<Average Fiber Length and Fiber Length Distribution of Pulp>

The subject properties were measured using ISO 16065-2.

<Average Fiber Length of Cellulose Nanofibers>

The fiber length was measured using an atomic force microscope image (3000 nm×3000 nm) of cellulose nanofibers fixed on a mica section to thereby calculate the average fiber length. The fiber length measurement was performed using an image analysis software WinROOF (Mitani Shoji) in the range of lengths of 100 nm to 2000 nm.

<Average Fiber Length of Cellulose Nanofibers>

An aqueous dispersion liquid of cellulose nanofibers was prepared so that it was diluted to a cellulose nanofibers concentration of 0.001 mass %. This diluted dispersion liquid was thinned out on the mica platform to be heated/dried at 50° C. to create an observation sample, and the cross sectional height of the image of the shape observed by the atomic force microscope (AFM) was measured to obtain an average fiber diameter.

<Measurement method of Aspect Ratio>

The aspect ratio was obtained by the following formula.

Aspect ratio=average fiber length/average fiber diameter

<Forming of Film of Cellulose Nanofibers>

The aforementioned cellulose nanofibers with a solid concentration of 1.0 mass % was measured off at 50 ml and poured onto the substrate (polyester film A4100, Toyobo Co.), and then held stationary in a blow drier at a temperature of 40° C. for a day. A film form of cellulose nanofibers that is 40 µm thick was obtained thereafter.

<Assessment of Coloring of Cellulose Nanofibers after Heating>

The film form of cellulose nanofibers obtained above was subjected to heating by a blow drier at a temperature of 150° C. for 30 min. The YI (Yellowness Index) of the film form of cellulose nanofibers before and after heating was measured using a spectrocolorimeter (SE6000, Nippon Denshoku Industries, Co.) in accordance with JIS K7373 and assessed.

Example B2

An experiment was performed similarly to Example B1 except that the sodium hydrogensulfite was added in an amount of 5 mg (addition rate based on cellulose nanofibers absolute dry solid: 1.0 mass %), and a dispersion liquid of cellulose nanofibers as well as a film form of cellulose nanofibers were obtained and their color after heating was assessed.

Example B3

An experiment was performed similarly to Example B1 except that the sodium hydrogensulfite was added in an amount of 50 mg (addition rate based on cellulose nanofibers absolute dry solid: 10 mass %), and a dispersion liquid of cellulose nanofibers as well as a film form of cellulose nanofibers were obtained and their color after heating was assessed.

Example B4

An experiment was performed similarly to Example B1 except that the sodium hypochlorite used for oxidizing pulp was added in an amount of 3.1 mmol/g and that the dispersion liquid was subjected to five cycles of treatment with the ultra high pressure homogenizer during defibration, and a dispersion liquid of cellulose nanofibers as well as a film form of cellulose nanofibers were obtained and their color after heating was assessed. The amount of carboxyl group in the obtained oxidized cellulose was 1.1 mmol/g.

Example B5

An experiment was performed similarly to Example B1 except that a bleached, unbeaten kraft pulp (average fiber length 1020 µm) derived from hardwood was used as the starting pulp, and a dispersion liquid of cellulose nanofibers as well as a film form of cellulose nanofibers were obtained and their color after heating was assessed.

Example B6

An experiment was performed similarly to Example B5 except that the sodium hydrogensulfite was added in an amount of 50 mg (addition rate based on cellulose nanofibers absolute dry solid: 10 mass %), and a dispersion liquid of cellulose nanofibers as well as a film form of cellulose nanofibers were obtained and their color after heating was assessed.

Example B7

An experiment was performed similarly to Example B1 except that a bleached, unbeaten kraft pulp (average fiber length 2270 µm) derived from softwood was used as the starting pulp, and a dispersion liquid of cellulose nanofibers as well as a film form of cellulose nanofibers were obtained and their color after heating was assessed.

Example B8

An experiment was performed similarly to Example B7 except that the sodium hydrogensulfite was added in an amount of 50 mg (addition rate based on cellulose nanofibers absolute dry solid: 10 mass %), and a dispersion liquid of cellulose nanofibers as well as a film form of cellulose nanofibers were obtained and their color after heating was assessed.

Example B9

An experiment was performed similarly to Example B1 except that sodium sulfite was added in an amount of 50 mg (addition rate based on cellulose nanofibers absolute dry solid: 10 mass %) instead of the sodium hydrogensulfite, and a dispersion liquid of cellulose nanofibers as well as a film form of cellulose nanofibers were obtained and their color after heating was assessed.

Comparative Example B1

An experiment was performed similarly to Example B1 except that no anti-coloring agent was added, and a dispersion liquid of cellulose nanofibers as well as a film form of cellulose nanofibers were obtained and their color after heating was assessed.

Comparative Example B2

An experiment was performed similarly to Example B1 except that sodium borohydride was added in an amount of 50 mg (addition rate based on cellulose nanofibers absolute dry solid: 10 mass %) instead of the sodium hydrogensulfite, and a dispersion liquid of cellulose nanofibers as well as a film form of cellulose nanofibers were obtained and their color after heating was assessed.

Comparative Example B3

An experiment was performed similarly to Example B1 except that sodium thiosulfate was added in an amount of 50 mg (addition rate based on cellulose nanofibers absolute dry solid: 10 mass %) instead of the sodium hydrogensulfite, and a dispersion liquid of cellulose nanofibers as well as a film form of cellulose nanofibers were obtained and their color after heating was assessed.

Comparative Example B4

An experiment was performed similarly to Example B5 except that no anti-coloring agent was added, and a dispersion liquid of cellulose nanofibers as well as a film form of cellulose nanofibers were obtained and their color after heating was assessed.

Comparative Example B5

An experiment was performed similarly to Example B7 except that no anti-coloring agent was added, and a dispersion liquid of cellulose nanofibers as well as a film form of cellulose nanofibers were obtained and their color after heating was assessed.

TABLE 2

| | Starting pulp | | Additive | | CNF physical property | | | CNF film | | |
|---|---|---|---|---|---|---|---|---|---|---|
| | Type | Average fiber length μm | Type of Additive | PRTR substance | Ratio mass % | Carboxyl amount mmol/g | Average fiber length nm | Average fiber diameter nm | before heating YI | after heating YI | $\Delta$YI |
| Example B1 | LBKP | 534 | sodium hydrogensulfite | No | 5 | 1.6 | 463 | 3.1 | 11.8 | 12.3 | 0.6 |
| Example B2 | LBKP | 534 | sodium hydrogensulfite | No | 1 | 1.6 | 463 | 3.1 | 12.1 | 16.5 | 4.4 |
| Example B3 | LBKP | 534 | sodium hydrogensulfite | No | 10 | 1.6 | 463 | 3.1 | 11.3 | 13.3 | 2.0 |
| Example B4 | LBKP | 534 | sodium hydrogensulfite | No | 5 | 1.1 | 489 | 4.4 | 11.2 | 11.6 | 0.4 |
| Example B5 | LBKP | 1020 | sodium hydrogensulfite | No | 5 | 1.6 | 590 | 2.6 | 12.6 | 15.2 | 2.6 |
| Example B6 | LBKP | 1020 | sodium hydrogensulfite | No | 10 | 1.6 | 590 | 2.6 | 12.3 | 16.1 | 3.8 |
| Example B7 | NBKP | 2270 | sodium hydrogensulfite | No | 5 | 1.6 | 802 | 2.2 | 11.8 | 12.5 | 0.7 |
| Example B8 | NBKP | 2270 | sodium hydrogensulfite | No | 10 | 1.6 | 802 | 2.2 | 12.0 | 12.8 | 0.8 |
| Example B9 | LBKP | 534 | sodium sulfite | No | 10 | 1.6 | 463 | 3.1 | 11.6 | 15.1 | 3.5 |
| Comp. Example B1 | LBKP | 534 | — | — | — | 1.6 | 463 | 3.1 | 12.7 | 39.6 | 26.9 |
| Comp. Example B2 | LBKP | 534 | sodium borohydride | Yes | 10 | 1.6 | 463 | 3.1 | 11.8 | 15.4 | 3.6 |
| Comp. Example B3 | LBKP | 534 | sodium thiosulfate | No | 10 | 1.6 | 463 | 3.1 | 11.5 | 29.8 | 18.3 |
| Comp. Example B4 | LBKP | 1020 | — | — | — | 1.6 | 590 | 2.6 | 13.5 | 44.9 | 31.4 |
| Comp. Example B5 | NBKP | 2270 | — | — | — | 1.6 | 802 | 2.2 | 14.1 | 64.1 | 50.0 |

With regards to the cellulose nanofibers of Examples B1 to B4, no significant change was seen in the physical properties, neither in the average fiber length nor the average fiber diameter, relative to the cellulose nanofibers of Comparative Examples B1 and B3, but a distinct difference was seen in the color change after heating. The same is true in the comparison of Examples B5 and B6 with Comparative Example B4, and Examples B7 and B8 with Comparative Example B5. Although both Example B9 and Comparative Example B2 exhibit a high level of suppression in coloring, sodium borohydride is designated as a PRTR (Pollutant Release and Transfer Register) substance in Japan, so its use should be avoided. Prevention or reduction of coloring after heating is advantageous in the industrial use of cellulose nanofibers, because it means that the material is not affected by a change in the color due to the heating process.

The invention claimed is:
1. A dispersion liquid of anion-modified cellulose nanofibers comprising:
    anion-modified cellulose nanofibers;
    an anti-coloring agent comprising borate salts; and
    a solvent, wherein:
    an amount of the borate salts in the dispersion liquid of
        anion-modified cellulose nanofibers is 1 to 30 mass % based on an absolute dry mass of the anion-modified cellulose nanofibers, and the borate salts are selected from the group consisting of $M_3BO_3$, $M_2HBO_3$, $MH_2BO_3$, $M_2(R\text{—}BO_2)$, and $M(R\text{—}BO_2H)$, wherein M is a monovalent metal ion and R is a monovalent hydrocarbon group.

2. The dispersion liquid according to claim 1, wherein a total amount of the anti-coloring agent is 1 to 15 mass % based on an absolute dry mass of the anion-modified cellulose nanofibers.

3. The dispersion liquid according to claim 1 having a pH of 6.5 to 10.

4. The dispersion liquid according to claim 1, wherein the anion-modified cellulose nanofibers have carboxyl groups in an amount of 0.5 to 2.0 mmol/g based on an absolute dry mass of anion-modified cellulose nanofibers.

5. The dispersion liquid according to claim 1, wherein the anion-modified cellulose nanofibers are carboxymethylated cellulose nanofibers having a degree of carboxymethyl substitution of 0.01 to 0.50 per a glucose unit of anion-modified cellulose nanofibers.

6. The dispersion liquid according to claim 1, wherein the anion-modified cellulose nanofibers are reduced by a reducing agent.

7. The dispersion liquid according to claim 1, wherein the anion-modified cellulose nanofibers have an average fiber length of 50 to 2000 nm, and an average fiber diameter of 2 to 50 nm.

8. A composition of anion-modified cellulose nanofibers obtained by removing a solvent from the dispersion liquid of anion-modified cellulose nanofibers according to claim 1.

9. A sheet containing the composition according to claim 8.

10. A method of manufacturing the dispersion liquid according to claim 1 comprising:
   (i) oxidizing a cellulose material in water using an oxidizing agent in the presence of an N-oxyl compound and a compound selected from the group consisting of bromides, iodides, and mixtures thereof to prepare oxidized cellulose;
   (ii) defibrating the oxidized cellulose to obtain a dispersion liquid of oxidized cellulose nanofibers; and
   (iii) obtaining a dispersion liquid of cellulose nanofibers containing the dispersion liquid of oxidized cellulose nanofibers and the anti-coloring agent, wherein:
   the anti-coloring agent comprises the borate salts, an amount of the borate salts in the dispersion liquid of anion-modified cellulose nanofibers is 1 to 30 mass % based on an absolute dry mass of the anion-modified cellulose nanofibers, and the borate salts are selected from the group consisting of $M_3BO_3$, $M_2HBO_3$, $MH_2BO_3$, $M_2(R\text{—}BO_2)$, and $M(R\text{—}BO_2H)$, wherein M is a monovalent metal ion and R is a monovalent hydrocarbon group.

11. A method of manufacturing the composition according to claim 8 comprising:
   (i) oxidizing a cellulose material in water using an oxidizing agent in the presence of an N-oxyl compound and a compound selected from the group consisting of bromides, iodides, and mixtures thereof to prepare oxidized cellulose;
   (ii) defibrating the oxidized cellulose to obtain a dispersion liquid of oxidized cellulose nanofibers;
   (iii) obtaining a dispersion liquid of cellulose nanofibers containing the dispersion liquid of oxidized cellulose nanofibers and the anti-coloring agent; and
   (iv) removing the water from the dispersion liquid of nanofibers, wherein:
   the anti-coloring agent comprises the borate salts, an amount of the borate salts in the dispersion liquid of anion-modified cellulose nanofibers is 1 to 30 mass % based on an absolute dry mass of the anion-modified cellulose nanofibers, and the borate salts are selected from the group consisting of $M_3BO_3$, $M_2HBO_3$, $MH_2BO_3$, $M_2(R\text{—}BO_2)$, and $M(R\text{—}BO_2H)$, wherein M is a monovalent metal ion and R is a monovalent hydrocarbon group.

\* \* \* \* \*